US010759103B2

(12) United States Patent
Takehana et al.

(10) Patent No.: US 10,759,103 B2
(45) Date of Patent: Sep. 1, 2020

(54) INJECTION BLOW MOLDING METHOD AND INJECTION BLOW MOLDING APPARATUS FOR HOLLOW CONTAINER

(71) Applicant: NISSEI ASB MACHINE CO., LTD., Komoro-shi, Nagano (JP)

(72) Inventors: Daizaburo Takehana, Komoro (JP); Masaki Aimi, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 669 days.

(21) Appl. No.: 15/325,322

(22) PCT Filed: Jul. 10, 2015

(86) PCT No.: PCT/JP2015/069912
§ 371 (c)(1),
(2) Date: Jan. 10, 2017

(87) PCT Pub. No.: WO2016/006686
PCT Pub. Date: Jan. 14, 2016

(65) Prior Publication Data
US 2017/0157823 A1 Jun. 8, 2017

(30) Foreign Application Priority Data
Jul. 11, 2014 (JP) .................................. 2014-143561

(51) Int. Cl.
| B29C 45/73 | (2006.01) |
| B29C 49/00 | (2006.01) |
| B29C 49/42 | (2006.01) |
| B29C 45/78 | (2006.01) |
| B29C 49/06 | (2006.01) |
| B29K 105/00 | (2006.01) |

(52) U.S. Cl.
CPC .............. *B29C 45/73* (2013.01); *B29C 45/78* (2013.01); *B29C 49/0031* (2013.01); *B29C 49/06* (2013.01); *B29C 49/42* (2013.01); *B29C 2045/7343* (2013.01); *B29K 2105/258* (2013.01)

(58) Field of Classification Search
CPC ..... B29C 45/73; B29C 49/0031; B29C 45/78; B29C 49/42; B29C 49/06; B29C 2045/7343; B29K 2105/258
See application file for complete search history.

(56) References Cited

U.S. PATENT DOCUMENTS

| 4,019,849 A | 4/1977 | Farrell |
| 4,356,142 A | 10/1982 | Germanio |

FOREIGN PATENT DOCUMENTS

| JP | 52-57259 | 5/1977 |
| JP | 56-127430 | 10/1981 |

(Continued)

OTHER PUBLICATIONS

International Search Report from the Japanese Patent Office for International Application No. PCT/JP2015/069912, dated Sep. 8, 2015.

(Continued)

*Primary Examiner* — Robert J Grun
(74) *Attorney, Agent, or Firm* — Finnegan, Henderson, Farabow, Garrett & Dunner, L.L.P.

(57) ABSTRACT

In a cooling adjustment step of cooling a preform held within an injection space to a predetermined temperature, cooling intensity for an injection core mold 124 is reduced as compared with cooling intensity for an injection cavity mold 123.

6 Claims, 9 Drawing Sheets

(56) References Cited

FOREIGN PATENT DOCUMENTS

| | | |
|---|---|---|
| JP | 57-105321 | 6/1982 |
| JP | 5-41761 | 6/1993 |
| JP | 5-185493 | 7/1993 |
| JP | 7-171888 | 7/1995 |
| JP | 8-300460 A | 11/1996 |
| JP | 8-323851 | 12/1996 |
| JP | 2006-346891 | 12/2006 |
| JP | 2007-098862 | 4/2007 |
| JP | 2011-520643 | 7/2011 |
| WO | WO 2009/127962 | 10/2009 |

OTHER PUBLICATIONS

Notification of Reason for Refusal issued in corresponding Korean Application No. 10-2017-7002957, dated Jul. 31, 2018.

INJECTION BLOW MOLDING METHOD AND INJECTION BLOW MOLDING APPARATUS FOR HOLLOW CONTAINER

TECHNICAL FIELD

This invention relates to an injection blow molding method and an injection blow molding apparatus for shaping a hollow container by the injection blow molding method.

BACKGROUND ART

Various proposals have been made so far for methods of molding resinous hollow containers. As a typical method, an injection blow molding method has been known which comprises forming a preform (parison) by injection molding, and blow molding the preform to shape a hollow container. An injection blow molding apparatus adopting this injection blow molding method is equipped with an injection molding section and a blow molding section. With this apparatus, a preform is injection molded in the injection molding section, and transported from the injection molding section to the blow molding section, with a neck portion of the preform being held, whereafter the preform is blow molded in the blow molding section to form a hollow container. Such an injection blow molding apparatus is called, for example, a 1-stage or hot parison injection blow molding apparatus.

With the injection blow molding apparatus, a mold release failure may occur, if the preform is not mold-released after it has been cooled to a predetermined temperature in the injection molding section. For example, when the preform is released from an injection blow mold constituting the injection molding section, a mold release failure, such as elongation, break, or so-called stringiness of a gate portion, may occur.

In the blow molding apparatus, therefore, the preform is cooled, as appropriate, in the injection molding section so that the preform is at an appropriate temperature. For example, there is a blow molding apparatus in which a temperature controlled cooling medium such as cooling water is flowed through flow paths formed in a cavity mold and an injection core mold constituting the injection molding section to cool resin (preform) charged into a cavity (see Patent Document 1).

PRIOR ART DOCUMENTS

Patent Documents

Patent Document 1: JP-UM-A-5-41761

SUMMARY OF THE INVENTION

Problems to be Solved by the Invention

Cooling of the preform in the injection molding section, as mentioned above, makes it possible to mold-release and transport the preform satisfactorily. If the residual heat of the preform transported to the blow molding section is in a small amount, however, the problem arises that the shapability of the preform during blow molding declines. That is, if the temperature of the preform is too low, there is a possibility that a hollow container of a desired shape will not be shapable by blow molding.

The present invention has been accomplished in the light of the foregoing circumstances. It is an object of the invention to provide an injection blow molding method and an injection blow molding apparatus for a hollow container which are capable of improving the shapability of an injection-molded preform during blow molding while suppressing its mold release failure.

Means for Solving the Problems

A first aspect of the present invention, aimed at solving the above problems, is a blow molding method, comprising: an injection molding step of injecting a resin material into an injection space defined by an injection cavity mold and an injection core mold, while cooling the injection cavity mold and the injection core mold, to form a preform; a cooling adjustment step of cooling the preform held within the injection space to a predetermined temperature; a transport step of mold-releasing the preform, with the injection core mold being inserted in the preform, from the injection cavity mold and also transporting the mold-released preform to a blow cavity mold; and a blow molding step of blow molding the preform within the blow cavity mold to form a hollow container, wherein at least in the cooling adjustment step, cooling intensity for the injection core mold is reduced as compared with cooling intensity for the injection cavity mold.

According to the first aspect, in the cooling adjustment step, the injection cavity mold is cooled with predetermined cooling intensity, whereby the outer peripheral surface of the preform is sufficiently cooled. Thus, the preform can be released satisfactorily from the injection cavity mold. On the other hand, cooling intensity for the injection core mold is reduced, whereby the residual heat of the mold-released preform is maintained at a relatively high level. Hence, the shapability of the preform during blow molding is improved.

A second aspect of the present invention is the blow molding method according to the first aspect, wherein for at least a partial period during the cooling adjustment step, cooling of the injection core mold is stopped, whereby the cooling intensity for the injection core mold is reduced.

According to the second aspect, the cooling intensity for the injection core mold can be adjusted relatively easily.

A third aspect of the present invention is the blow molding method according to the second aspect, wherein over the entire period of the cooling adjustment step, the cooling of the injection core mold is stopped.

According to the third aspect, the cooling intensity for the injection core mold is reduced more greatly, so that the residual heat of the preform can be retained further reliably.

A fourth aspect of the present invention is the blow molding method according to any one of the first to third aspects, wherein the injection cavity mold and the injection core mold are cooled by flowing a temperature controlled cooling medium through flow paths provided in the injection cavity mold and the injection core mold, and the amount of the temperature controlled cooling medium flowed through the injection core mold is decreased as compared with the injection cavity mold, whereby the cooling intensity for the injection core mold is reduced.

According to the fourth aspect, the cooling intensity for the injection core mold can be adjusted relatively easily.

A fifth aspect of the present invention is a blow molding apparatus, comprising: an injection molding section equipped with an injection cavity mold and an injection core mold, and adapted to inject a resin material into an injection space defined by the injection cavity mold and the injection core mold to form a preform; a transport section for mold-releasing the preform, with the injection core mold being inserted in the preform, from the injection cavity mold and also transporting the mold-released preform to a blow cavity mold; and a blow molding section for blow molding the preform within the blow cavity mold to form a hollow container, the blow molding apparatus further comprising cooling section for cooling the injection cavity mold and the injection core mold, wherein the cooling section reduces cooling intensity for the injection core mold, as compared with cooling intensity for the injection cavity mold, during a cooling period during which the preform is cooled in the injection molding section.

According to the fifth aspect, the injection cavity mold is cooled with predetermined cooling intensity by the cooling section, whereby the outer peripheral surface of the preform is sufficiently cooled. Thus, the preform can be released satisfactorily from the injection cavity mold. On the other hand, cooling intensity for the injection core mold is reduced, whereby the residual heat of the mold-released preform is maintained at a relatively high level.

Hence, the shapability of the preform during blow molding is improved.

Effects of the Invention

With the present invention as described above, the shapability of an injection-molded preform during blow molding can be improved, with its mold release failure being suppressed.

MODE FOR CARRYING OUT THE INVENTION

An embodiment of the present invention will now be described in detail by reference to the accompanying drawings.

Figure 1:
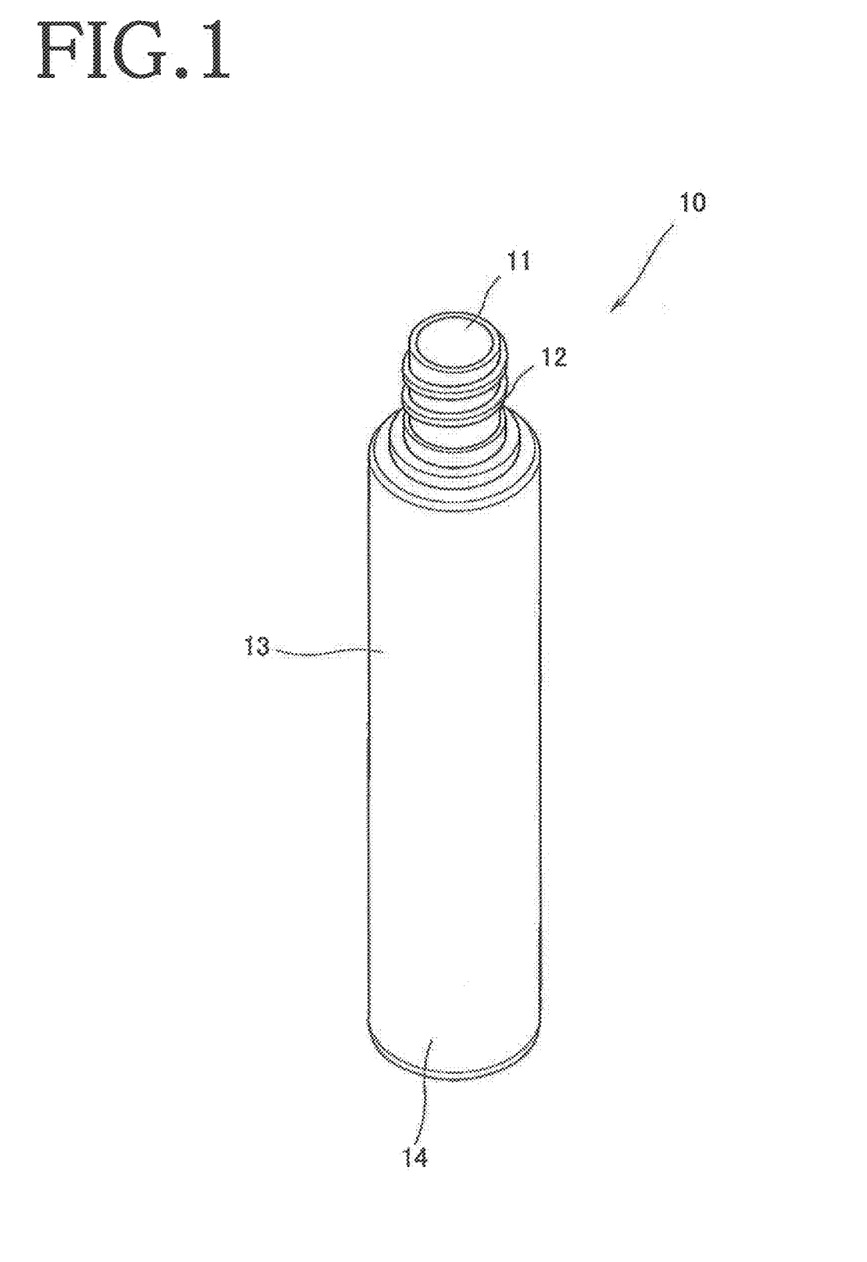
FIG. 1 is a perspective view showing an example of a hollow container according to the present invention.
Figure 2:
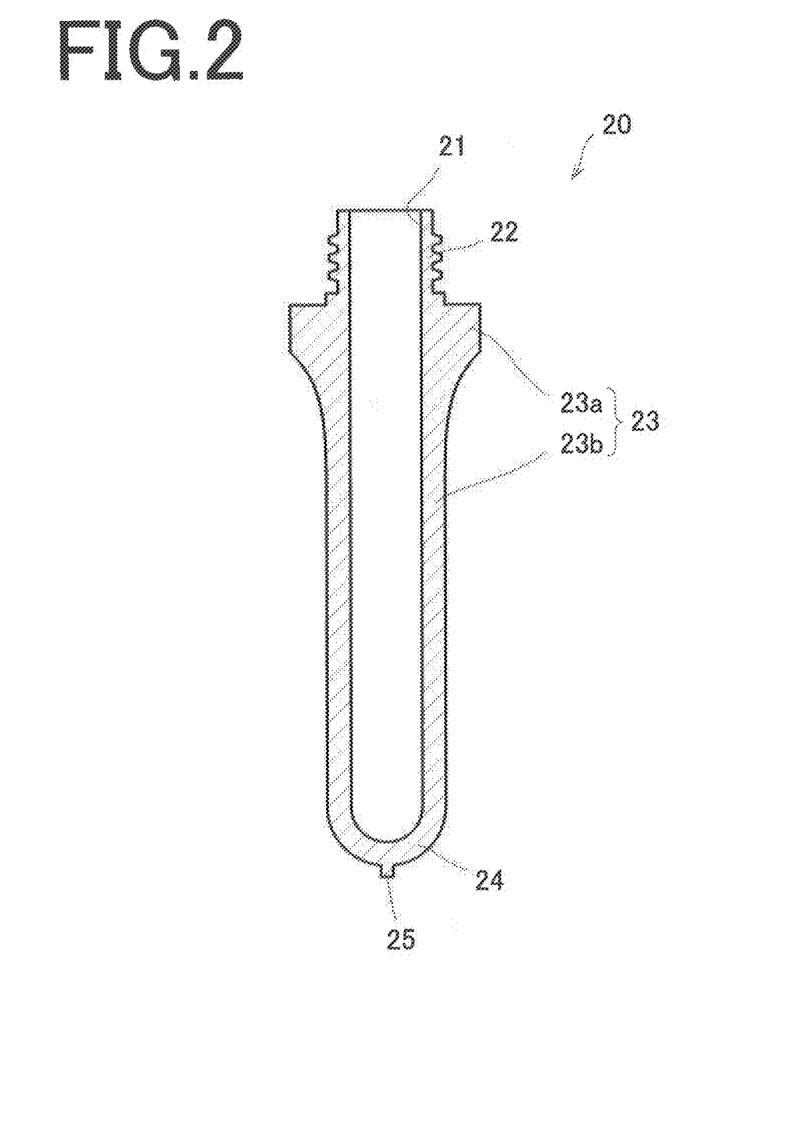
FIG. 2 is a sectional view showing an example of a preform according to the present invention.

FIG. 1 is a perspective view showing an example of a hollow container according to the present invention. FIG. 2 is a sectional view showing an example of an injection-molded preform.

A hollow container 10 shown in FIG. 1 is composed of a neck 12 having a mouth 11 at the upper end, a cylindrical barrel 13 continuous with the neck 12, and a bottom 14 continuous with the barrel 13. The hollow container 10 according to the present embodiment is a relatively narrow-mouthed, small cylindrical container storing, for example, a toilet lotion or a milky lotion, and the barrel 13 and the bottom 14 are each formed with a relatively large wall thickness (for example, of the order of 4 to 8 mm). The hollow container 10 comprises a resin material such as polyethylene terephthalate (PET), and is formed by blow molding a preform of a predetermined shape. The external shape of the hollow container 10 is only an example, and is not limitative.

A preform 20 for shaping the hollow container 10 according to the present embodiment is composed of a neck portion 22 having an opening 21 at the upper end and formed with a threaded groove on the outer periphery, a tubular barrel portion 23 continuous with the neck portion 22, and a semispherical bottom portion 24 continuous with the barrel portion 23, as shown in FIG. 2. The barrel portion 23 of the preform 20 includes a large-diameter part 23a, which constitutes an end part beside the neck portion 22 and has nearly the same diameter as the diameter of the barrel 13 of the hollow container 10, and a small-diameter part 23b of a smaller diameter than the diameter of the large-diameter part 23a. A boundary between the large-diameter part 23a and the small-diameter part 23b is formed such that the diameter of the barrel portion 23 gradually decreases from the large-diameter part 23a up to the small-diameter part 23b. The wall thicknesses of the barrel portion 23 and the bottom portion 24 of the preform 20 are relatively large in conformity with the wall thickness of the hollow container 10 (e.g., of the order of 2 to 4 mm).

The preform 20 has a gate portion 25 protruding from the bottom portion 24. The preform 20 is formed by injection molding a resin material, and then the hollow container 10 as described above is formed from the preform 20 by blow molding. The gate portion 25 is formed so as to protrude from the bottom portion 24 when the preform 20 is formed by injection molding.

Figure 3:
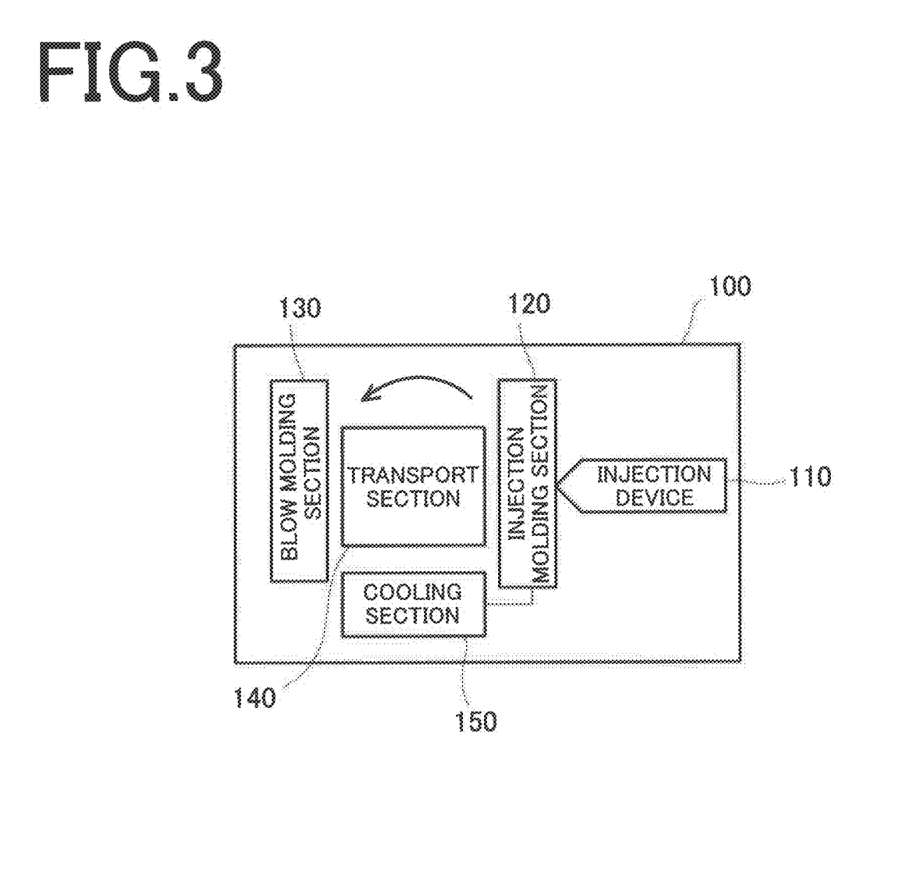
FIG. 3 is a block diagram showing the schematic configuration of an injection blow molding apparatus according to an embodiment of the present invention.
Figure 4:
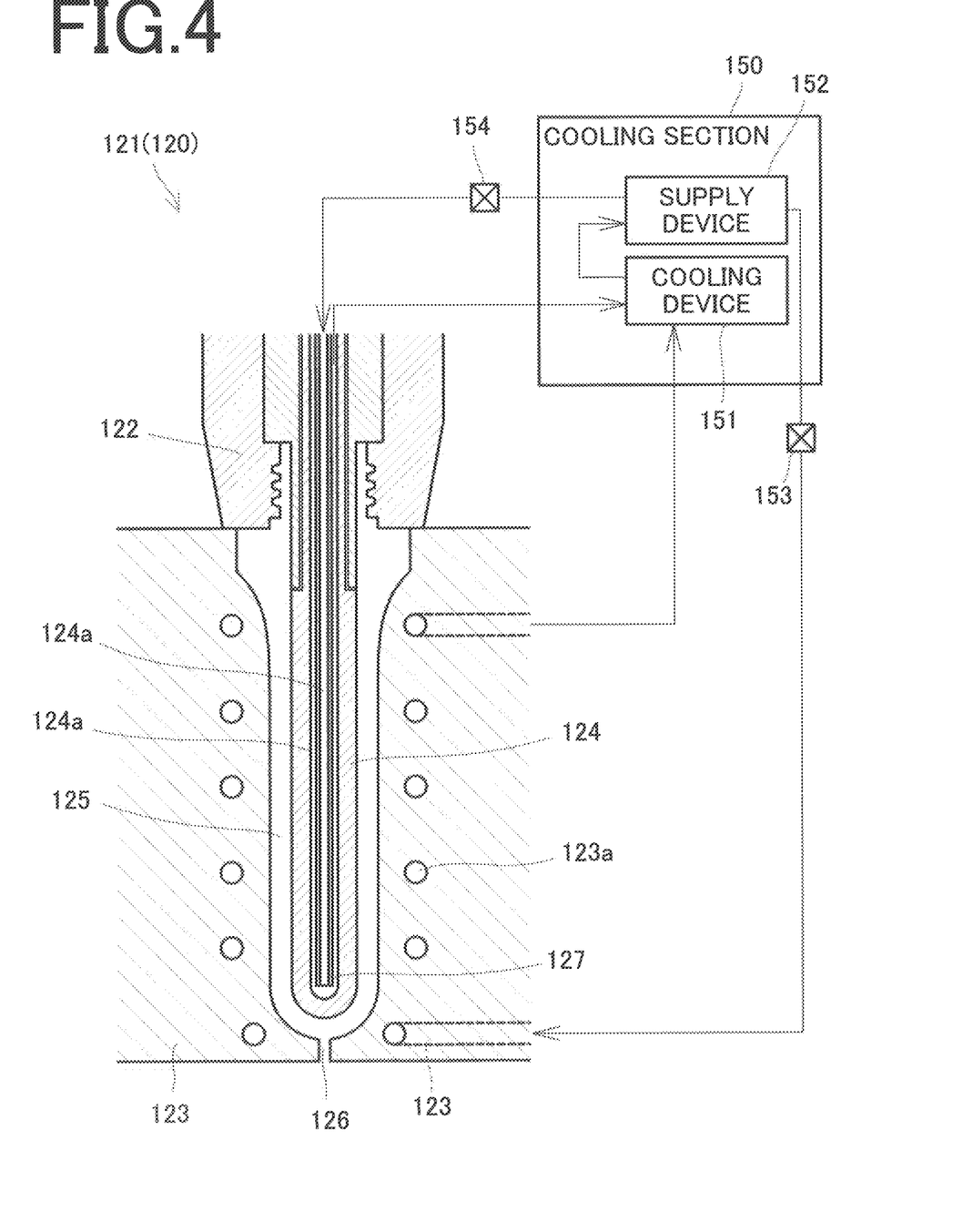
FIG. 4 is a sectional view showing an injection mold according to the embodiment of the present invention.
Figure 5:
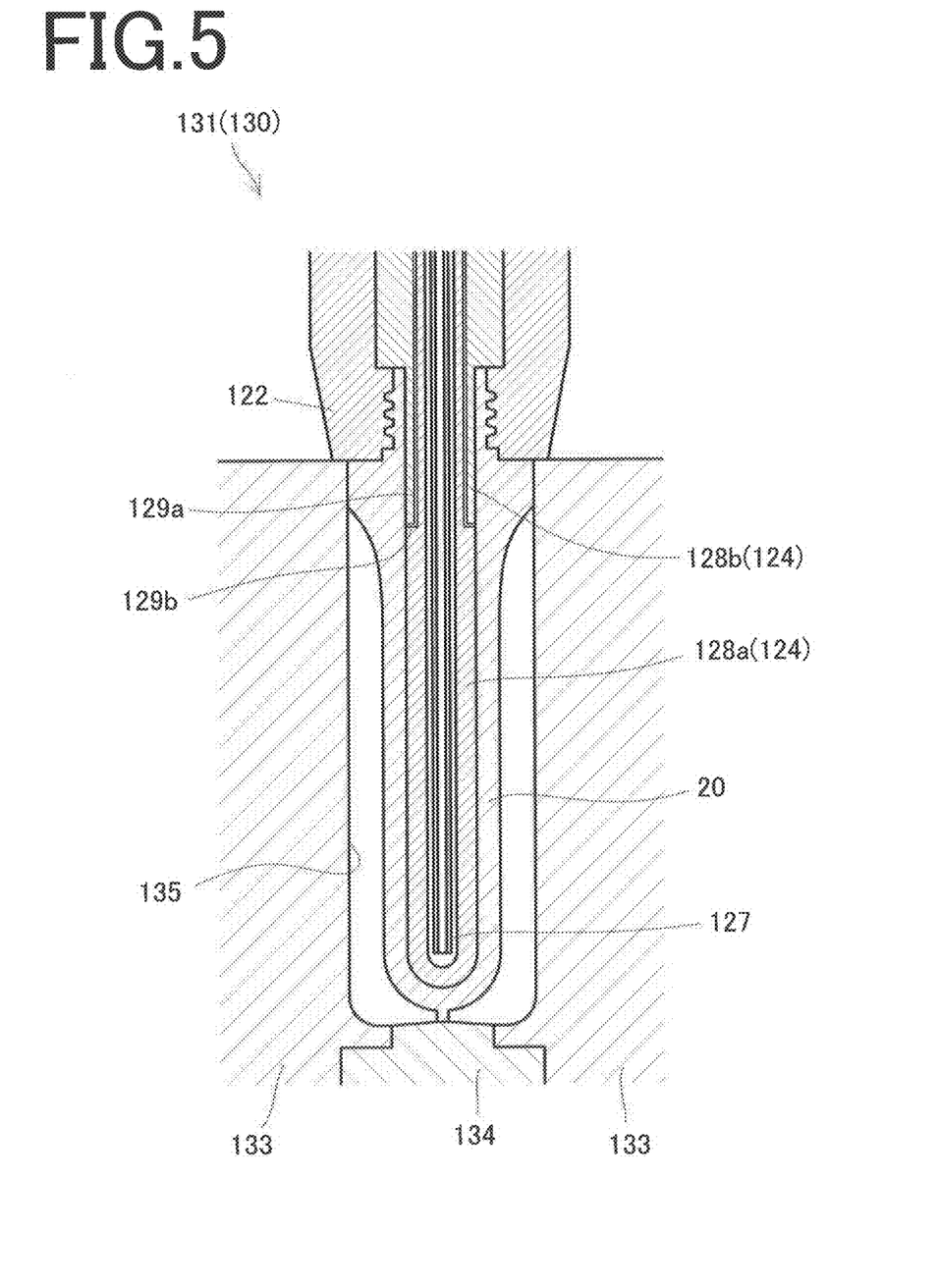
FIG. 5 is a sectional view showing a blow mold according to the embodiment of the present invention.

Next, an injection blow molding apparatus for shaping the hollow container 10 will be described. FIG. 3 is a block diagram showing the injection blow molding apparatus according to the present embodiment. FIG. 4 is a sectional view showing an example of an injection mold constituting an injection molding section. FIG. 5 is a sectional view showing an example of a blow mold constituting a blow molding section.

As shown in FIG. 3, an injection blow molding apparatus 100 has an injection molding section 120 connected to an injection device 110 for injection molding the preform 20; a blow molding section 130 for blow molding the preform 20 to form the hollow container 10; and a transport section 140 for transporting the preform 20 from the injection molding section 120 to the blow molding section 130. In the present embodiment, for example, the injection molding section 120 and the blow molding section 130 are arranged around the transport section 140 and, by rotating the transport section 140 through a predetermined angle (e.g., 180°), the preform 20 is transported from the injection molding section 120 to the blow molding section 130.

The injection molding section 120 is equipped with an injection mold 121 for injection molding the preform 20, as shown in FIG. 4. The injection mold 121 is composed of a neck mold 122 which comprises a split mold openable and closable in the horizontal direction and defines the outer wall surface of the neck portion 22 of the preform 20; an injection cavity mold 123 for defining the outer wall surface of the barrel portion 23 of the preform 20; and an injection core mold 124 for defining the inner wall surfaces of the neck portion 22 and the barrel portion 23 of the preform 20. In the injection molding section 120, the resin material is supplied from a gate 126, which is provided in a lower part of the center of the injection cavity mold 123, into an injection space 125 defined by the above injection cavity mold 123, injection core mold 124, etc., to injection-mold the preform 20.

The transport section 140 transports the preform 20 injection-molded in the injection molding section 120 to the blow molding section 130. Concretely, when the preform 20 is released from the injection cavity mold 123 in the injection molding section 120, the transport section 140 transports the preform 20 from the injection molding section 120 to the blow molding section 130, with the neck portion 22 being held by the neck mold 122 and the injection core mold 124 being inserted in the preform 20.

The injection blow molding apparatus 100 is further equipped with a cooling section (cooling means) 150 for cooling the injection cavity mold 123 and the injection core mold 124 constituting the injection mold 121, in order to cool the resin material (preform 20) charged into the injection space 125 (see FIGS. 3 and 4). The cooling section 150 includes a cooling device 151 for cooling a temperature controlled cooling medium, and a supply device 152 composed of, for example, a pump or the like for supplying the temperature controlled cooling medium cooled by the cooling device 151 to the injection cavity mold 123 and the injection core mold 124. That is, the cooling section 150 supplies the temperature controlled cooling medium such as cooling water, as appropriate, to flow paths formed in the injection cavity mold 123 and the injection core mold 124, to cool the injection cavity mold 123 and the injection core mold 124 to a predetermined temperature, thereby cooling the preform 20 to the predetermined temperature. The cooling section 150 is configured to be capable of cooling the injection core mold 124 even during transport of the preform 20 by the transport section 140.

In the present embodiment, a flow path 123a through which the temperature controlled cooling medium flows is continuously formed around the injection space 125 of the injection cavity mold 123. On the other hand, the injection core mold 124 is formed to be hollow, and a cooling pipe 127 is disposed inside the injection core mold 124. The cooling pipe 127 has an outer diameter smaller than the inner diameter of the injection core mold 124, and the spaces outside and inside the cooling pipe 127 disposed within the injection core mold 124 serve as a flow path 124a through which the temperature controlled cooling medium is flowed.

The cooling section 150 allows the cooling device 151 to cool a predetermined amount of the temperature controlled cooling medium to a predetermined temperature, and allows the supply device 152 to supply this temperature controlled cooling medium to each of the flow paths 123a and 124a at a predetermined timing. The temperature controlled cooling medium used for cooling the injection cavity mold 123 and the injection core mold 124 is returned to the cooling section 150, cooled to the predetermined temperature by the cooling device 151, and then supplied again to each of the flow paths 123a and 124a by the supply device 152.

The cooling section 150 is configured to be capable of adjusting cooling intensity for the injection cavity mold 123 and cooling intensity for the injection core mold 124 individually. For example, opening/closing valves 153, 154 are provided between the supply device 152 and the flow paths 123a, 124a, respectively. The cooling section 150 controls, as appropriate, the opening/closing action of these opening/closing valves 153, 154 to control the supply of the temperature controlled cooling medium to the flow paths 123a, 124a, thereby adjusting the cooling intensity for the injection cavity mold 123 or the injection core mold 124. As will be described in detail later, the cooling intensities for the injection cavity mold 123 and the injection core mold 124 are adjusted, as appropriate, whereby the releasability of the preform 20 from the injection cavity mold 123 can be maintained satisfactorily, and the shapability of the preform 20 in the blow molding section 130 can be improved.

The blow molding section 130 is equipped with a blow mold 131 for blow molding the preform, as shown in FIG. 5. The blow mold 131 includes a blow cavity mold 133 consisting of a split mold openable and closable in the horizontal direction, and a blow cavity bottom mold 134. The preform 20 transported from the injection molding section 120 by the transport section 140 is disposed within the blow cavity mold 133, with the neck portion 22 being held by the neck mold 122 and the injection core mold 124 being inserted in the preform 20, as described earlier.

The injection core mold 124 according to the present embodiment has a first core pin 128a and a second core pin 128b. An air flow path 129a and an air blowoff port 129b are formed between the first core pin 128a and the second core pin 128b. In the blow molding section 130, high pressure blown air is supplied into the preform 20 via the air flow path 129a and the air blowoff port 129b. The preform 20 is stretched mainly in the horizontal axis direction by this blown air, and pressed against the inner wall surface 135 of the blow mold 131, whereby the hollow container 10 is molded.

Next, an injection blow molding method for the hollow container 10 by use of such a so-called one-stage injection blow molding apparatus 100 will be described by reference to FIG. 6, particularly, in connection with a temperature control method for the preform 20.

Figure 6:
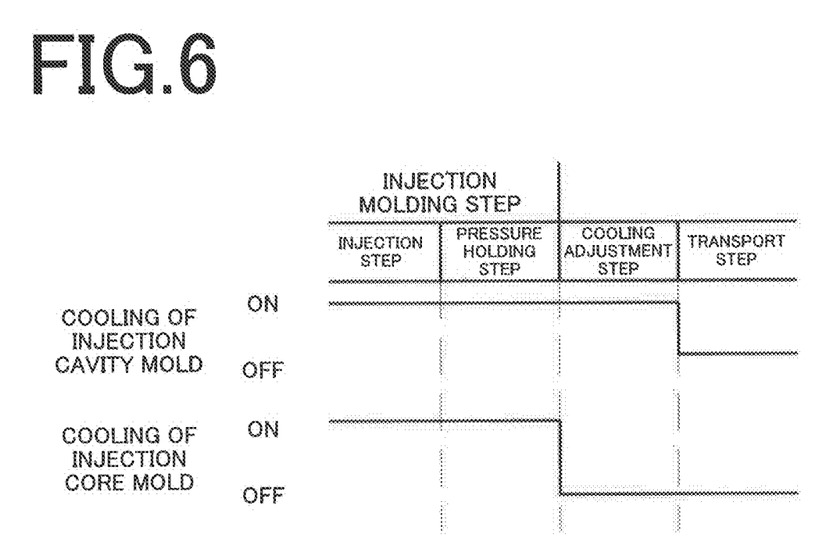
FIG. 6 is a view illustrating an injection blow molding method according to the embodiment of the present invention.

As shown in FIG. 6, the injection molding section 120 according to the present embodiment executes an injection molding step of injecting the resin material into the injection space 125 to form the preform 20; and a cooling adjustment step of cooling the resin material (preform 20) to a predetermined temperature, while holding it within the injection space 125. In the present embodiment, moreover, the injection molding step includes an injection step of injection resin into the injection space 125, and a pressure holding step of holding the resin material (preform 20) charged into the injection space 125 at a predetermined pressure. The pressure holding step may be executed if required, and need not necessarily be executed.

In the present embodiment, the cooling section 150, during the injection molding step (injection step and pressure holding step), supplies the temperature controlled cooling medium to the flow paths 123a, 124a of the injection cavity mold 123 and the injection core mold 124, with the opening/closing valves 153, 154 being open. That is, in the injection molding step, the injection cavity mold 123 and the injection core mold 124 are each cooled (cooling ON). Thus, the cooling intensities for the injection cavity mold 123 and the injection core mold 124 are substantially coincident.

Then, when the process is shifted from the injection molding step to the cooling adjustment step in the injection molding section 120, the cooling section 150 reduces the cooling intensity for the injection core mold in comparison with the cooling intensity for the injection cavity mold. In the present embodiment, upon the shift to the cooling adjustment step, the cooling section 150 switches the opening/closing valve 154 to a closed state to stop the supply of the temperature controlled cooling medium to the flow path 124*a* of the injection core mold 124 (cooling OFF), throughout the entire period of the cooling adjustment step. During the cooling adjustment step, therefore, the outer surface of the resin material (preform 20) is cooled by the injection cavity mold 123 (cooling ON), whereas the inner surface of the resin material (preform 20) is not cooled by the injection core mold 124 (cooling OFF).

When the cooling adjustment step is completed, the preform 20 is released from the injection cavity mold 123, and transported from the injection molding section 120 to the blow molding section 130 by the transport section 140 (transport step). At this time, cooling of the preform 20 by the injection cavity mold 123 ends (cooling OFF). On the other hand, cooling of the preform 20 by the injection core mold 124 is also stopped (cooling OFF) during transport of the preform 20. According to the present embodiment, cooling of the preform 20 by the injection core mold 124 has already been stopped in the cooling adjustment step, so that this state (cooling intensity for the injection core mold 124) is maintained in the transport step as well. That is, the cooling section 150 maintains even in the transport step the state of supply of the temperature controlled cooling medium to the flow path 124*a* of the injection core mold 124 being stopped (cooling OFF).

With the present embodiment, during the transport step, cooling of the preform 20 by the injection cavity mold 123 is stopped, but this cooling of the preform 20 by the injection cavity mold 123 need not necessarily be stopped. In this case as well, it goes without saying that the injection cavity mold 123 during the transport step is at a lower temperature than that of the injection core mold; in other words, the cooling intensity for the injection cavity mold is relatively higher than that for the injection core mold.

Then, upon completion of the transport of the preform 20 to the blow molding section 130, a blow molding step of blow molding the preform 20 within the blow mold 131 to form the hollow container 10 is executed. The molded hollow container 10 is withdrawn from the blow molding section 130, or from a separately provided withdrawal section, to the outside of the apparatus.

In the injection blow molding method for a hollow container according to the present embodiment described above, the cooling intensity for the injection core mold 124 is reduced as compared with the cooling intensity for the injection cavity mold 123, at least in the cooling adjustment step. Thus, the shapability of the preform 2 can be improved, with its mold releasability being maintained satisfactorily. Particularly in shaping the hollow container 10 with the use of a relatively thick-walled preform 20 as in the present embodiment, the above procedure is effective.

In detail, when the preform 20 is released from the injection cavity mold 123 after completion of the cooling adjustment step, the outer surface of the preform 20 has been sufficiently cooled by the injection cavity mold 123. Thus, the occurrence of a mold release failure, such as elongation, break, or so-called stringiness of the gate portion 25, can be suppressed. The injection core mold 124, on the other hand, is transported, together with the preform 20, from the injection molding section 120 to the blow molding section 130, as described earlier. In other words, when the cooling adjustment step is completed, the preform 20 is not released from the injection core mold 124. Thus, even if the cooling intensity for the injection core mold 124 is reduced, as compared with the cooling intensity for the injection cavity mold 123, during the cooling adjustment step, the preform 20 can be transported satisfactorily from the injection molding section 120 to the blow molding section 130. Furthermore, since the cooling intensity for the injection core mold 124 is reduced, as compared with the cooling intensity for the injection cavity mold 123, during the cooling adjustment step, the preform 20 retains a relatively large quantity of heat even after the preform 20 is transported to the blow molding section 130. Hence, the preform 20 can be deformed into the hollow container 10 of a desired shape by blow molding.

A surface state was compared between a hollow container according to an Example shaped by the injection blow molding method of the present invention and a hollow container according to a Comparative Example shaped by a conventional injection blow molding method.

In connection with the hollow container according to the Example, a preform having a barrel portion including a large-diameter part of nearly the same diameter as the diameter of the barrel 13 of the hollow container 10, and a small-diameter part, as mentioned above, was injection molded. On this occasion, the supply of the temperature controlled cooling medium to the injection core mold was stopped over the entire periods of the cooling adjustment step and the transport step. Then, this preform was blow-molded to form a hollow container. On the other hand, a hollow container according to the Comparative Example was formed under the same conditions as those in the Example, except that the amount of supply (flow-through amount) of the temperature controlled cooling medium to the injection core mold during the cooling adjustment step and the transport step was not adjusted.

Figure 7:
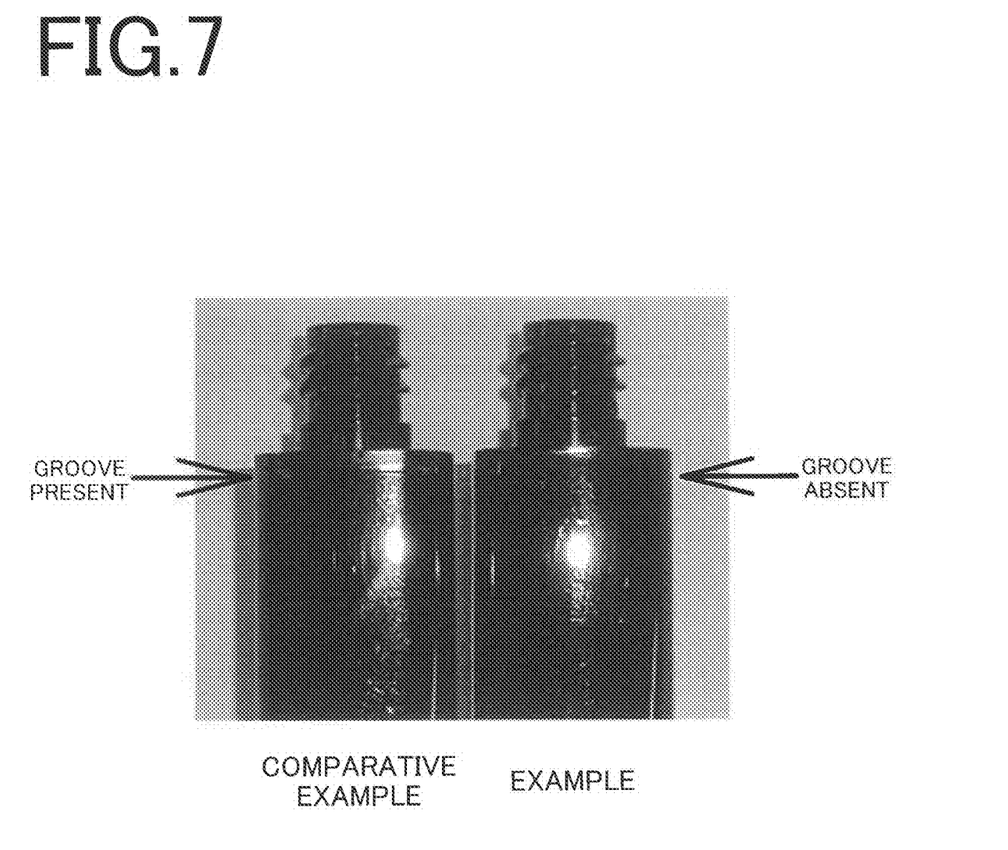
FIG. 7 is a photograph showing the surface state of a hollow container according to an Example and the surface state of a hollow container according to a Comparative Example.

As shown in FIG. 7, the hollow container of the Comparative Example has a groove formed in a part corresponding to the end of the large-diameter part of the preform, whereas the hollow container of the Example does not have this groove present there. As these results demonstrate, the injection blow molding method according to the present invention improves the shapability during blow molding, and can form the hollow container of a desired shape. A probable cause of the groove formation is as follows: Prior to blow molding, excessive cooling occurs in the large-diameter part of the preform, and necessary residual heat is lost at this site to bring about a nearly solidified state there. Consequently, a marked difference in the degree of stretching has arisen between the large-diameter part and the small-diameter part.

In the present embodiment, cooling of the injection core mold 124 is stopped over the entire period of the cooling adjustment step. However, the period of cooling stoppage is not particularly limited, and cooling of the injection core mold 124 may be stopped for a partial period during the cooling adjustment step.

Figure 8:
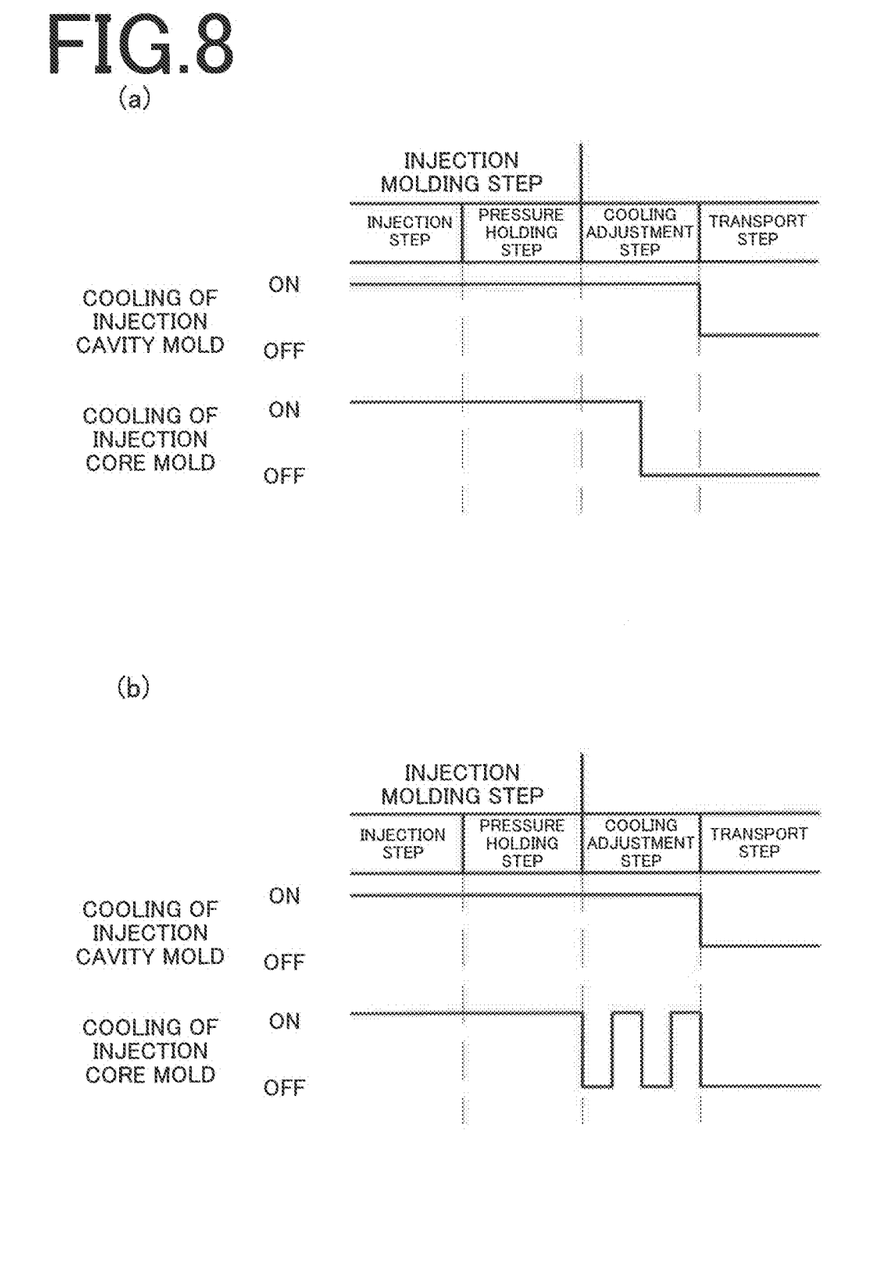
FIGS. 8(a), 8(b) are views illustrating other examples of the injection blow molding method according to the embodiment of the present invention.

For example, as shown in FIG. 8(*a*), the opening/closing valve 154 may be switched from an open state to a closed state to stop the cooling of the injection core mold 124, in the latter half of the duration of the cooling adjustment step. Also, as shown in FIG. 8(*b*), for example, the cooling of the injection core mold 124 may be performed intermittently during the cooling adjustment step.

Figure 9:
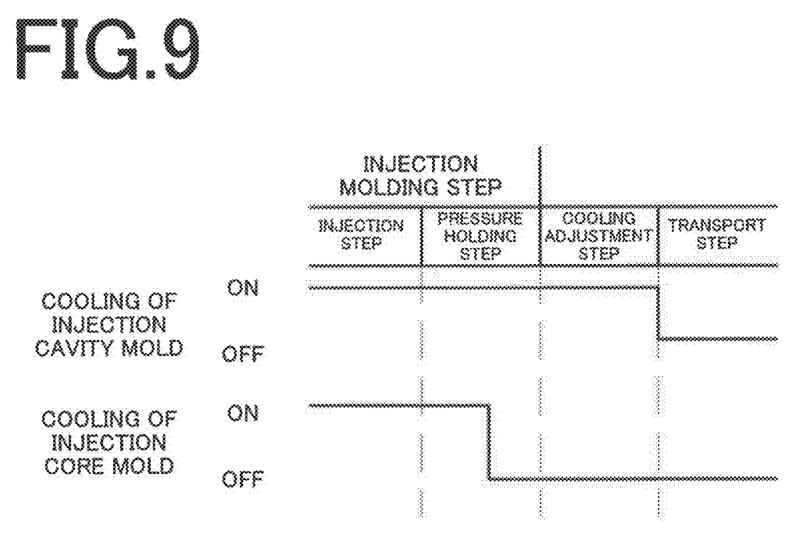
FIG. 9 is a view illustrating another example of the injection blow molding method according to the embodiment of the present invention.

In the present embodiment, moreover, cooling of the injection core mold 124 is stopped in the cooling adjustment step and the transport step. However, cooling of the injection core mold may also be stopped in a partial period during the pressure holding step. For example, as shown in FIG. 9, the cooling of the injection core mold 124 may also be stopped in the latter half of the duration of the pressure holding step.

In the present embodiment, moreover, cooling of the injection core mold 124 is stopped not only in the cooling adjustment step, but also in the transport step. However, cooling of the injection core mold 124 may be performed in the transport step.

Furthermore, in the present embodiment, the supply of the temperature controlled cooling medium to the injection core mold 124 is stopped for at least a partial period during the cooling adjustment step. However, the supply need not necessarily be stopped completely. For example, it is acceptable to employ a valve capable of flow rate adjustment as the opening/closing valve 154 and decrease the amount of the temperature controlled cooling medium supplied to the injection core mold 124.

Besides, it is permissible to provide the cooling section 150 with the independent supply device 152 for each of the injection cavity mold 123 and the injection core mold 124, and increase the amount of the temperature controlled cooling medium supplied to the injection cavity mold 123. By so doing, the cooling intensity for the injection core mold 124 may be relatively reduced as compared with the cooling intensity for the injection cavity mold 123.

Anyway, the cooling intensity for the injection core mold 124 in the cooling adjustment step is reduced as compared with the cooling intensity for the injection cavity mold 123. As mentioned above, therefore, the shapability of the preform 20 can be improved, with its mold releasability being maintained satisfactorily.

The present invention has been described above in connection with its one embodiment, but it is to be understood that the invention is in no way limited to this embodiment.

In the foregoing embodiment, the amount of the temperature controlled cooling medium supplied to the injection core mold is controlled in the cooling adjustment step, etc., whereby the cooling intensity for the injection core mold is reduced as compared with the cooling intensity for the injection cavity mold. However, the method for reducing the cooling intensity for the injection core mold as compared with the cooling intensity for the injection cavity mold is not particularly limited.

For example, the temperature of the temperature controlled cooling medium supplied to the injection core mold may be made lower than the temperature of the temperature controlled cooling medium supplied to the injection cavity mold. Concretely, the temperature of the temperature controlled cooling medium supplied to the injection core mold may be lowered, or the temperature of the temperature controlled cooling medium supplied to the injection cavity mold may be raised. In this case, the cooling section is configured to have an independent cooling device for each of the injection cavity mold and the injection core mold.

In the above embodiment, moreover, the injection blow molding apparatus illustrated is one which injection-molds the preform and stretches this preform mainly in the horizontal axis direction by high pressure air to shape the hollow container. However, the present invention can also be applied to a so-called biaxially stretching blow molding apparatus which stretches a preform in a vertical axis direction and a horizontal axis direction by a stretching rod and high pressure air to form a hollow container.

EXPLANATIONS OF LETTERS OR NUMERALS

10 Hollow container
11 Mouth
12 Neck
13 Barrel
14 Bottom
20 Preform
21 Opening
22 Neck portion
23 Barrel portion
23a Large-diameter part
23b Small-diameter part
24 Bottom portion
25 Gate portion
100 Injection blow molding apparatus
110 Injection device
120 Injection molding section
121 Injection mold
122 Neck mold
123 Injection cavity mold
123a Flow path
124 Injection core mold
124a Flow path
125 Injection space
126 Gate
127 Cooling pipe
128a First core pin
128b Second core pin
129a Air flow path
129b Air blowoff port
130 Blow molding section
131 Blow mold
133 Blow cavity mold
134 Blow cavity bottom mold
135 Inner wall surface
140 Transport section
150 Cooling section
151 Cooling device
152 Supply device
153, 154 Opening/closing valve

The invention claimed is:

1. A blow molding method, comprising:
    an injection molding step of injecting a resin material into an injection space defined by an injection cavity mold and an injection core mold, while cooling the injection cavity mold and the injection core mold, to form a preform;
    a cooling adjustment step of cooling the preform held within the injection space to a predetermined temperature;
    a transport step of mold-releasing the preform, with the injection core mold being inserted in the preform, from the injection cavity mold and transporting the mold-released preform to a blow cavity mold; and
    a blow molding step of blow molding the preform within the blow cavity mold to form a hollow container,
    wherein at least in the cooling adjustment step, cooling intensity for the injection core mold is reduced as compared with cooling intensity for the injection cavity mold;
    wherein the cooling intensity for the injection core mold in the cooling adjustment step is lower than cooling intensity for the injection core mold in the injection molding step.

2. The blow molding method according to claim 1, wherein
    for at least a partial period during the cooling adjustment step, cooling of the injection core mold is stopped, whereby the cooling intensity for the injection core mold is reduced.

3. The blow molding method according to claim 2, wherein
    over an entire period of the cooling adjustment step, the cooling of the injection core mold is stopped.

4. The blow molding method according to claim 1, wherein the injection cavity mold and the injection core mold are cooled by flowing a temperature controlled cooling medium through flow paths provided in the injection cavity mold and the injection core mold, and an amount of the temperature controlled cooling medium flowed through the injection core mold is decreased as compared with the injection cavity mold, whereby the cooling intensity for the injection core mold is reduced.

5. The blow molding method according to claim 2, wherein the injection cavity mold and the injection core mold are cooled by flowing a temperature controlled cooling medium through flow paths provided in the injection cavity mold and the injection core mold, and an amount of the temperature controlled cooling medium flowed through the injection core mold is decreased as compared with the injection cavity mold, whereby the cooling intensity for the injection core mold is reduced.

6. The blow molding method according to claim 3, wherein the injection cavity mold and the injection core mold are cooled by flowing a temperature controlled cooling medium through flow paths provided in the injection cavity mold and the injection core mold, and an amount of the temperature controlled cooling medium flowed through the injection core mold is decreased as compared with the injection cavity mold, whereby the cooling intensity for the injection core mold is reduced.

* * * * *